(12) United States Patent
Schnell et al.

(10) Patent No.: US 11,319,932 B2
(45) Date of Patent: May 3, 2022

(54) DISPLACEABLE MAINTENANCE DEVICE, DISPLACEABLE ASSEMBLY DEVICE, AND METHOD

(71) Applicant: Wobben Properties GmbH, Aurich (DE)

(72) Inventors: Hendrik Schnell, Aurich (DE); Harro Harms, Wiesmoor (DE); Markus Longeru, Stade (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/103,653

(22) Filed: Nov. 24, 2020

(65) Prior Publication Data

US 2021/0172424 A1 Jun. 10, 2021

(30) Foreign Application Priority Data

Dec. 6, 2019 (DE) .......................... 102019133423.3

(51) Int. Cl.
| | |
|---|---|
| *B25J 5/02* | (2006.01) |
| *B25J 11/00* | (2006.01) |
| *B23P 6/00* | (2006.01) |
| *F03D 13/10* | (2016.01) |
| *B23P 19/06* | (2006.01) |
| *F03D 80/50* | (2016.01) |

(52) U.S. Cl.
CPC ................ *F03D 13/10* (2016.05); *B23P 6/00* (2013.01); *B23P 19/067* (2013.01); *B25J 5/02* (2013.01); *B25J 11/005* (2013.01); *B23P 19/06* (2013.01); *F03D 80/50* (2016.05); *F05B 2260/301* (2013.01)

(58) Field of Classification Search
CPC .......... B23P 6/00; B23P 19/06; B23P 19/067; F05B 2260/301; F03D 13/10; F03D 80/50
See application file for complete search history.

(56) References Cited

U.S. PATENT DOCUMENTS

| | | |
|---|---|---|
| 6,785,637 B1 | 8/2004 | Wobben |
| 2013/0289769 A1 | 10/2013 | Park et al. |

FOREIGN PATENT DOCUMENTS

| | | |
|---|---|---|
| CN | 105571763 B | 8/2018 |
| DE | 19948194 C2 | 11/2001 |
| DE | 202016105934 U1 | 9/2017 |
| EP | 2607685 B1 | 3/2014 |
| EP | 3195974 A1 | 7/2017 |

*Primary Examiner* — Jermie E Cozart
(74) *Attorney, Agent, or Firm* — Seed Intellectual Property Law Group LLP

(57) ABSTRACT

Provided is a displaceable maintenance device, to a displaceable assembly device, to a method for servicing a fastening element, and to a method for servicing and/or assembling a fastening element of a flange of a wind power installation tower. Provided is a displaceable maintenance device for a wind power installation tower, comprising a mobile unit which is specified for moving the maintenance device along a flange of the wind power installation tower; a first maintenance unit having an impact element for impacting a fastening element, in particular a flange connection element, and a noise-receiver unit for detecting a noise generated by the impacting; a control unit for evaluating the noises detected by means of the noise-receiver unit, said control unit, based on the evaluation, being specified for assigning a maintenance status to a fastening element.

22 Claims, 11 Drawing Sheets

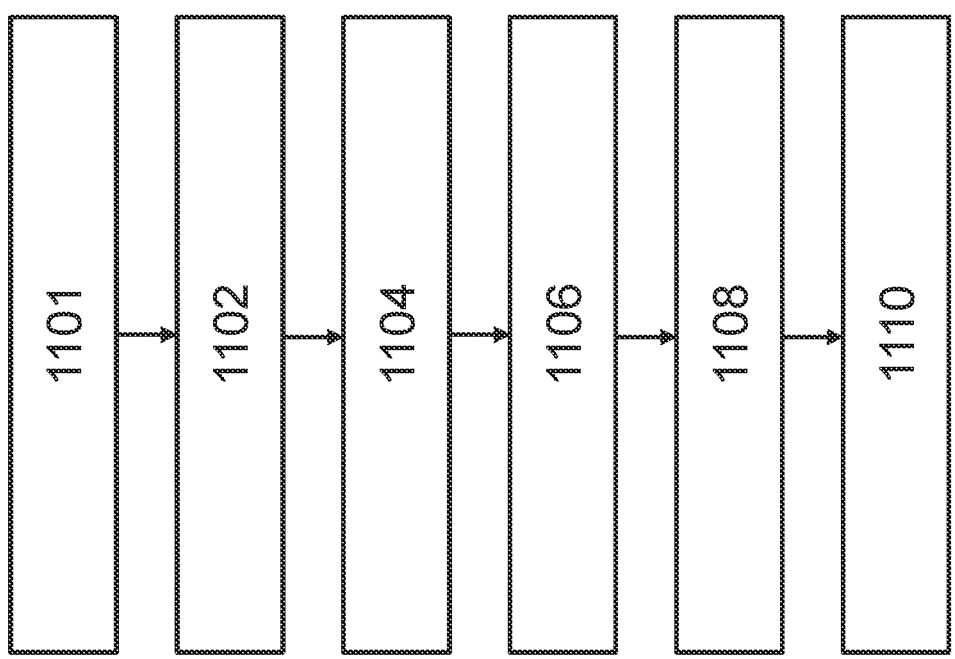

DISPLACEABLE MAINTENANCE DEVICE, DISPLACEABLE ASSEMBLY DEVICE, AND METHOD

BACKGROUND

Technical Field

The invention relates to a displaceable maintenance device, to a displaceable assembly device, to a method for servicing a fastening element, and to a method for servicing and/or assembling a fastening element of a flange of a wind power installation tower.

Description of the Related Art

Wind power installations are known. They produce electrical power from wind. Wind power installations typically relate to horizontal-axis wind power installations in which the rotor axis is aligned so as to be substantially horizontal and the rotor blades sweep a substantially perpendicular rotor face. Apart from an aerodynamic rotor which is disposed on a nacelle, wind power installations comprise a tower on which the nacelle having the aerodynamic rotor is disposed so as to be rotatable about an axis that is disposed so as to be substantially vertical.

In the operation of the wind power installation, the aerodynamic rotor is set in a rotating movement by the wind and thus also rotates an electrodynamic rotor or armature of a generator which is coupled directly or indirectly to the aerodynamic rotor. The electric generator is disposed in the nacelle and generates electric energy.

Towers of wind power installations are typically slender constructions having a great height, said slender constructions having a comparatively minor extent in particular in a manner orthogonal to said height. The towers are often produced from concrete and/or from steel. The most common types of towers for wind power installations relate to tubular concrete towers and/or tubular steel towers. These tubular towers in the vertical direction and/or in the horizontal circumferential direction are often segmented so that the tubular towers comprise two or more tower segments. The segmentation is required for transporting the towers or tower segments, respectively, from a production site to the commissioning site of the wind power installation.

The tower segments usually have horizontal and/or vertical flanges. The horizontal flanges are specified for connecting vertically neighboring segments to one another. In contrast, the horizontal flanges are specified for connecting horizontally neighboring tower segments to one another. The connection typically takes place with fastening elements, in particular with screws. These fastening elements are assembled when assembling and/or servicing and checked for their correct fit. Robots for moving along a flange are described in EP 3 195 974 A1 and in EP 2 607 685 B1, the robots therein however not being suitable for servicing screws.

The assembly and/or maintenance is time and personnel consuming since a plurality of fastening elements are typically required for the flanges in a tower of a wind power installation so that the assembly and maintenance are associated with a high complexity in terms of cost. Moreover, the assembling and optionally the subsequent checking of the fastening elements is time-consuming in such a manner that the construction of the wind power installation is tedious, and the construction of an entire wind farm is thus also time-consuming. Moreover, the manual assembly can also be prone to errors.

BRIEF SUMMARY

Provided is a displaceable maintenance device, a displaceable assembly device, and a method for servicing a fastening element, and a method for servicing and/or assembling a fastening element of a flange of a wind power installation tower, said devices and methods mitigating or eliminating one or a plurality of the mentioned disadvantages. Provided is a solution which enables cost-effective and/or rapid assembling of a tower of a wind power installation which in particular requires a small number of personnel.

According to a first aspect, provided is a displaceable maintenance device for a wind power installation tower, comprising a mobile unit which is specified for moving the maintenance device along a flange of a wind power installation tower; a first maintenance unit having an impact element for impacting a fastening element, in particular a flange connection element, and a noise-receiver unit for detecting a noise generated by the impacting; a control unit for evaluating the noises detected by means of the noise-receiver unit, said control unit, based on the evaluation, being specified for assigning a maintenance status to a fastening element.

The disclosure is based on the concept that the impacting of a fastening element as well as the evaluation of the noise generated thereby are re-occurring activities when assembling a tower of a wind power installation. When assembling a tower of a wind power installation, this activity has typically to be carried out several dozen times and typically several hundred times. The inventors have realized that this re-occurring activity is possible by means of a maintenance device according to the first aspect. The assembly and/or maintenance complexity can be reduced by combining a correspondingly configured mobile unit for moving the maintenance device along the flange and a first maintenance unit configured for carrying out the impacting.

The displaceable maintenance device comprises the mobile unit for moving the maintenance device along the flange of the wind power installation tower. The mobile unit is in particular specified for moving the maintenance device in a substantially horizontal direction along a horizontal flange. The horizontal flanges of wind power installation towers usually protrude radially inward into a cavity which is configured by tower walls of the wind power installation tower.

Furthermore, the flanges usually have a horizontal face with passage openings. These openings are provided for disposing fastening elements, in particular screws. Tower segments usually extend from a lower flange toward an upper flange. In the intended use of the tower segment, the lower flange faces the foundation, and the upper flange in the intended use faces a tower head.

The lower flange usually has an upper horizontal face that faces the tower head, and the lower horizontal face that faces the tower foundation. In the intended operation, the lower horizontal face usually bears on an upper horizontal face of an upper horizontal flange of a vertically neighboring tower segment. The upper horizontal face of the lower flange is typically suitable for the displaceable maintenance device to be disposed thereon.

The mobile unit is preferably specified for moving on a horizontal flange, in particular on an upper horizontal face of this flange, of a wind power installation tower that has fastening elements, in particular screws.

The displaceable maintenance device furthermore comprises the first maintenance unit. The first maintenance unit has an impact element for impacting a fastening element, in particular a flange connection element, in particular a screw. The fastening element is impacted by the impact element, and the noise created can provide an indication as to whether the screw has a predetermined maintenance status. It can in particular be determined by means of the noise whether the fastening element has a loose fit or has a torque bearing thereon. In order for the noise generated by the impacting to be detected, the first maintenance unit has the noise-receiver unit. The noise-receiver unit is in particular specified for detecting the noise and preferably for storing data characterizing the noise and/or for relaying said data and/or for providing said data to the control unit.

The impact element can be configured as a hammer element, for example. The impact element preferably has an impact head and an impact shank.

The displaceable maintenance device furthermore has the control unit. The control unit is in particular specified for evaluating the noise detected by means of the noise-receiver unit. The control unit, based on the evaluation, is specified for assigning a maintenance status to a fastening element. The control unit for this assignation preferably comprises a data and/or signal processing unit. For example, the maintenance status can assume the value tight or loose. Moreover, the value of the maintenance status can also characterize a torque bearing on said fastening element in terms of the order of said torque, for example by means of torque ranges. The control unit in terms of signaling is preferably coupled to the first maintenance unit, in particular to the noise-receiver unit. This coupling can be configured so as to be wire-based and/or wireless.

One preferred variant of embodiment of the displaceable maintenance device is distinguished in that said displaceable maintenance device comprises at least one guide rail for guiding the maintenance device along the fastening element of the flange. The fastening elements on the flange are typically configured as screws which have a screw head. The screws which are disposed in a circular manner along the flange can be utilized for guiding the displaceable maintenance device. For this purpose, the displaceable maintenance device in this preferred variant of embodiment has the at least one guide rail. The guide rail in the operation of the displaceable maintenance device can bear on at least one fastening element, preferably on two or a plurality of fastening elements, and thus guide the displaceable maintenance device and allow the latter by means of the mobile unit to travel in particular safely along the flange.

It is preferable for the displaceable maintenance device to have an inner guide rail and an outer guide rail. An inner guide rail and an outer guide rail are preferably disposed in such a manner that, when displacing the maintenance device along the flange, the inner guide rail is disposed on a radially inward side of the fastening elements, and the outer guide rail is disposed on a radially outward side of the fastening elements that lies opposite the inward side.

The inner guide rail and the outer guide rail are preferably mutually spaced apart in such a manner that the fastening element is able to be disposed therebetween with a clearance fit. The displaceable maintenance device is guided in the radial direction on account of a disposal of the guide rails of this type. Guiding of the displaceable maintenance device in the vertical direction is typically not required since said displaceable maintenance device is disposed on the flange. Guiding in the circumferential direction is substantially not required in the sense that the displaceable maintenance device is intended to be moved in this direction by means of the mobile unit.

The inner guide rail and the outer guide rail when in operation are preferably spaced apart in the radial direction, in particular in the radial tower direction, so that particularly advantageous guiding of the maintenance device by the fastening elements is enabled.

The at least one guide rail and/or the inner guide rail and/or the outer guide rail preferably extend from a first rail end toward a second rail end. Said guide rails preferably have in each case curved profile between the first end and the second end such that a radius is in each case present. This radius preferably corresponds to a flange radius such that the guide rails correspond to the profile of the fastening elements.

Furthermore preferably, the at least one guide rail and/or the inner guide rail and/or the outer guide rail at the first end and/or at the second end have/has an introduction rail portion which is preferably funnel-shaped and improves the introduction of a fastening element between the two guide rails. The radial spacing between the inner guide rail and the outer guide rail is preferably enlarged in the introduction portion. It is particularly preferable for this portion of the inner guide rail to be curved radially inward, and for the portion of the outer guide rail to be curved or bent, respectively, radially outward. On account thereof, a larger introduction portion is configured such that the travel of the displaceable maintenance device along the fastening elements is improved, since the fastening elements are introduced between the rails.

In one further preferred refinement of the displaceable maintenance device it is provided that the mobile unit has at least two wheel elements. The at least two wheel elements can be rotationally symmetrical discs, for example, which are rotatably disposed on the displaceable maintenance device. The at least two wheel elements are preferably disposed and configured in such a manner that said at least two wheel elements support the displaceable maintenance device on the flange and by way of a rotating movement facilitate or enable the movement of the displaceable maintenance device.

It is particularly preferable for the mobile unit to have four wheel elements, wherein two wheel elements are preferably disposed on opposite sides at a rear end of the maintenance device, and to further wheel elements are disposed on two opposite sides at the front end of the maintenance device.

In one further preferred refinement of the maintenance device it is provided that the mobile unit comprises a magnetic unit which is specified for moving the maintenance device on a vertical internal circumferential face of the flange along this flange, wherein the maintenance device preferably has a support structure which by means of structural elements is coupled to the magnetic unit. The magnetic unit can also be partially or completely disposed on a neighboring flange.

A mobile unit configured in such a manner enables the displaceable maintenance device to be moved even on such flanges where a movement on the flange is not possible or possible only in an impeded manner. This can be the case, for example, when there is little space for the maintenance device in the radial direction beside the fastening elements.

The magnetic unit preferably comprises one or a plurality of solenoids which can be switched on and switched off and can also be referred to as magnetic feet. The maintenance device with the aid of these magnetic feet can "walk" along the tower wall on the end sides of the flanges or above the flanges. This preferably takes place in that part of the magnetic feet, for example 2 of 4 magnetic feet, are in each case switched on. The switched-on magnetic feet adhere while the switched-off magnetic feet are advanced. The respective other magnetic feet are then switched on so as to establish adhesion, and the first magnetic feet can be switched off for advancing.

One further preferred variant of embodiment of the displaceable maintenance device is distinguished in that the mobile unit has an upper clamp and/or a lower clamp, wherein the upper clamp is configured so as to act in a supporting manner on a vertically upper side of the flange, and/or the lower clamp is configured so as to act in a supporting manner on a vertically lower side of the flange and/or of a neighboring flange.

The procedure of clamping is preferably similar to that of the magnetic feet, but the maintenance device does not hold onto the end side of the flange on account of magnetic forces, but holds on by way of, preferably 4, clamps which, in particular the pairs of clamps thereof, can be released in an alternating manner so as to walk along the flange.

In one further preferred refinement of the displaceable maintenance device it is provided that the mobile unit comprises a drive unit which is preferably configured as an electric motor. The drive unit is preferably coupled to at least one of the at least two wheel elements, preferably four wheel elements. This coupling can be mechanical, for example. It is furthermore preferable for the drive unit in terms of signaling to be coupled to the control unit. This coupling in terms of signaling can be configured so as to be wire-based or wireless, for example.

In one further preferred refinement of the displaceable maintenance device it is provided that the noise-receiver unit is configured as a microphone. The noise-receiver unit can also be configured as an accelerometer. An accelerometer can detect reactions such as vibrations or impulses which are triggered by the impact element, for example.

In one further preferred variant of embodiment of the displaceable maintenance device it is provided that said displaceable maintenance device comprises an interface for reading the maintenance status, wherein the interface is preferably configured as a wire-based interface and/or a wireless interface. The interface is in particular specified for exchanging data and/or for receiving data and/or for transmitting data.

The maintenance status of fastening elements of one or a plurality of flanges can be read by means of such an interface. The displaceable maintenance device can thus autonomously travel along a flange of wind power installation and determine the maintenance statuses of the individual fastening elements, for example. An operator can subsequently read these maintenance statuses by way of the interface. The wireless interface to this extent has a further advantage in that the operator can access the individual maintenance statuses and resort to corresponding measures already during the maintenance procedure.

One further preferred refinement of the displaceable maintenance device is distinguished in that the control unit is specified for moving the maintenance device along the flange by actuating the mobile unit, wherein the actuation preferably takes place in such a manner that the maintenance device is moved along the flange in such a manner that successive impacting of fastening elements by the impact element can take place.

The displaceable maintenance device can be moved in intervals, for example. This means in particular that the maintenance device is moved by the mobile unit to one fastening element, the impacting and the detecting of the generated noise takes place there, and the maintenance device is then subsequently moved onward to the next fastening element. Alternatively, the displaceable maintenance unit can also be continuously moved, and the impacting and the detecting of the generated noise can be carried out so as to be temporarily parallel to the movement.

It is moreover preferable for the control unit to be specified for storing the maintenance status in a readable storage medium. It is in particular preferable for the storage medium in terms of signaling to be coupled to the interface, in particular to the wire-based interface and/or the wireless interface.

In one further preferred variant of embodiment of the displaceable maintenance device it is provided that the control unit in terms of signaling is coupled to the first maintenance unit and is specified for providing an impact signal for carrying out the impacting for the first maintenance unit, and the first maintenance unit when receiving the impact signal is specified for carrying out the impacting of the fastening element, and/or for receiving a noise signal which characterizes the noise and is generated by the first maintenance unit, in particular by the noise-receiver unit, and for evaluating said noise signal in terms of the maintenance status, wherein the maintenance status preferably represents a fastening element that is disposed according to the intended use, in particular a screw that is fastened according to the intended use, or represents a fastening element that is not disposed according to the intended use, in particular a screw that is not fastened according to the intended use.

In one further preferred refinement of the displaceable maintenance device it is provided that said displaceable maintenance device comprises a first climbing unit which is specified for moving the assembly device along a cat ladder of the wind power installation tower.

The first climbing unit can be configured, for example, so as to correspond to the second climbing unit which will be explained in more detail hereunder. The displaceable maintenance device by means of the first climbing unit can move upward and/or downward in the vertical direction in the wind power installation tower. Wind power installation towers usually have a cat ladder by way of which a user can move from the foot of the tower in the direction of the tower head. Such cat ladders are usually equipped with one or two struts, wherein the climbing unit can be specified in such a manner that the latter can move along the strut or the struts, respectively.

According to one further aspect, the object mentioned at the outset is achieved by a displaceable assembly device for a wind power installation tower, comprising a second climbing unit which is specified for moving the assembly device along a wind power installation tower, in particular along a cat ladder of a wind power installation tower; a second maintenance unit having an impact element for impacting a fastening element, and a noise-receiver unit for detecting a noise generated by the impacting, and a control unit for evaluating the noises detected by means of the noise-receiver unit, said control unit, on the basis of the noise, being specified for assigning a maintenance status to the fastening element, and/or an assembly unit having an assembly arm for positioning an assembly tool on a fastening element of the wind power installation tower, wherein the assembly tool is specified for fastening the fastening element.

The displaceable assembly device comprises the second climbing unit and is equipped either with the second maintenance unit or the assembly unit or, apart from the second climbing unit, comprises the second maintenance unit and the assembly unit.

The second climbing unit is preferably specified for moving the assembly device along a wind power installation tower, in particular along a cat ladder of a wind power installation tower. The second climbing unit is preferably specified for establishing a force-fitting and/or form-fitting connection to the cat ladder.

Alternatively, the second climbing unit is preferably specified for moving the assembly device along a wind power installation tower, without the cat ladder being utilized to this end. To this end, the second climbing unit preferably has mobile elements such as, for example, telescopic arms having climbing feet and/or rollers by means of which the assembly device can be moved along the wind power installation tower.

The second maintenance unit can be configured so as to correspond to the first maintenance unit; the second maintenance unit can in particular have the same features as the first maintenance unit described above.

The assembly unit comprises the assembly arm for positioning an assembly tool to the fastening element of the wind power installation tower, wherein the assembly tool is specified for fastening the fastening element. The displaceable assembly device can thus advantageously move upward and downward in the vertical direction along the cat ladder, and meanwhile reach a plurality of fastening elements of the wind power installation tower by means of the assembly arm.

It is moreover preferable for the assembly unit to comprise an impact element for impacting a fastening element, and a noise-receiver unit for detecting a noise generated by the impacting. The assembly unit can also comprise exclusively the impact element and the noise-receiver unit.

In one preferred variant of embodiment of the displaceable assembly device it is provided that the second climbing unit comprises a clamping device for disposing the assembly device on the cat ladder, wherein the clamping device preferably has a first clamping unit and a second clamping unit.

The clamping device is preferably specified for fixing and/or moving the displaceable assembly device in particular in the vertical direction on the cat ladder. This means in particular that the clamping device couples the displaceable assembly device to the cat ladder in such a manner that said displaceable assembly device remains or is moved in a defined vertical position. Moreover, the clamping device can have a drive so that the second climbing unit with the clamping device can move upward and/or downward in the vertical direction on the cat ladder. The first clamping unit can be disposed on a first strut of a ladder, for example, and the second clamping unit can be disposed on a second strut of the cat ladder. The struts are in particular outward elements of the cat ladder that are aligned so as to be substantially vertical, wherein the struts are typically connected to horizontal bars.

In one further preferred variant of embodiment of the displaceable assembly device it is provided that the first clamping unit and the second clamping unit have in each case two clamping rollers for fixing the assembly device in the vertical direction are able to be disposed in two opposite sides of a strut of the cat ladder that are spaced apart in the radial tower direction. The first clamping unit and/or the second clamping unit preferably having in each case four clamping rollers that are disposed in pairs on top of one another in the vertical direction.

The clamping rollers can be configured in the shape of rolls, for example. One clamping unit preferably comprises in each case two clamping rollers. These two clamping rollers preferably engage on two opposite sides of the strut of the cat ladder that are spaced apart in the radial tower direction. A clamping effect can be achieved by a corresponding contact pressure force between the clamping rollers. The clamping effect can be further improved in the case of each clamping unit having a total of four disposed clamping rollers. To this end, it is preferable for each clamping unit to have two pairs of clamping rollers which are preferably disposed on top of one another in the vertical direction. The external circumferential face of the clamping rollers can be composed of an elastomer or comprise the latter, for example. It is in particular preferable for the clamping rollers on the external circumferential face thereof to have or comprise a material which conjointly with a cat ladder can configure a high coefficient of friction.

In one further preferred refinement of the displaceable assembly device it is provided that the clamping rollers are able to be driven by a drive so as to move the assembly device in the vertical direction along the cat ladder. The clamping rollers preferably have in each case one clamping roller shaft. The clamping roller shaft of the clamping rollers are preferably coupled to the drive. Alternatively, the displaceable assembly device can also have a dedicated drive for each clamping roller or for each pair of clamping rollers. The clamping rollers can also have an integrated roller drive, for example.

In one further preferred refinement of the displaceable assembly device, it is provided that said assembly device has a drive unit by way of which the latter can be moved in the vertical direction along the cat ladder, wherein said drive unit in terms of the drive train is not substantially coupled to the clamping rollers.

One further refinement of the displaceable assembly device is distinguished in that the assembly arm is configured as an articulated arm. An assembly arm configured as an articulated arm has the advantage that the latter, when correspondingly dimensioned, can substantially reach all fastening elements of a flange in a wind power installation tower. On account of the articulated arm which preferably has more than one, preferably more than two, in particular more than three, articulations the assembly arm by way of the distal end thereof can also reach such fastening elements which are disposed behind other devices, for example internal assembly platforms or cable strands, for example.

In one further preferred variant of embodiment of the displaceable assembly device it is provided that the assembly tool is configured as a screwdriver tool for generating a torque on the fastening element, and/or the assembly element is configured as a tensioning cylinder for stretching the fastening element.

In the construction of the tower, the fastening elements can be disposed from a temporary working platform in the interior of the tower and be pre-tensioned so as to be impact-driver tight, for example. The temporary working platform can subsequently be moved vertically upward in the tower, and the next tower segments can be disposed, and the fastening elements to be attached there are likewise disposed in an impact-driver tight manner. The displaceable assembly device follows the temporary working platform and carries out a final assembly of the fastening elements, wherein the latter are in particular impinged with a pre-defined torque.

On account of the stretching of the fastening elements, substantially no torque, or a minor torque, respectively, is required for disposing a nut on the fastening element, for example. In this case, the fastening element by way of the tensioning cylinder is stretched in such a manner that said fastening element continues to protrude from a screw opening and a nut can thus be screw-fitted to the thread of the fastening element. Once the nut has been screw-fitted to the thread, the stretching of the fastening element by the tensioning cylinder can be cancelled, and the fastening element has a tight fit.

According to one further aspect of the present invention, provided is a combination of the displaceable maintenance device and the displaceable assembly device. This device can have the features of the previously described displaceable maintenance device and the features of the displaceable assembly device.

According to one further aspect, provided is a method for servicing a fastening element of a flange of a wind power installation tower, comprising the method steps: moving a maintenance device, in particular a maintenance device according to the aspect described above, along a flange of a wind power installation tower; impacting the fastening element, detecting a noise generated by the impacting, evaluating the noise, and assigning a maintenance status to the fastening element.

In one preferred variant, this method comprises the method step: moving the maintenance device into a region adjacent to a cat ladder of the wind power installation tower, and/or moving the maintenance device along the cat ladder, preferably upward in the vertical direction.

According to one further aspect, provided is a method for servicing and/or assembling a fastening element of a flange of a wind power installation tower, comprising the method steps: moving an assembly device, in particular an assembly device according to the aspect described above, along a cat ladder of the wind power installation tower; impacting the fastening element, detecting a noise generated by the impacting, evaluating the noise, and assigning a maintenance status to the fastening element; and/or positioning an assembly tool on the fastening element and fastening the fastening element.

In one preferred variant of embodiment of this method it is provided that said method comprises the steps: disposing and pre-tensioning, in particular so as to be impact-driver tight, the fastening elements by means of an assembly tool; and/or moving the assembly device upward in the vertical direction, and subsequently carrying out the positioning.

The methods and the potential refinements thereof have features or method steps, respectively, which render said methods and refinements particularly suitable for use with a displaceable maintenance device and/or displaceable assembly device and the respective refinements of said devices.

In terms of further advantages, variants of embodiments, and details of the embodiments of the further aspects and the potential refinements thereof reference is also made to the description above, to the corresponding features and refinements of the displaceable maintenance device and/or of the displaceable assembly device.

BRIEF DESCRIPTION OF THE SEVERAL VIEWS OF THE DRAWINGS

Preferred exemplary embodiments will be explained in an exemplary manner by means of the appended figures in which:

FIGS. 10-11 show schematic exemplary methods for servicing and/or assembling a fastening element of a flange of a wind power installation tower.

Identical elements or elements which are substantially identical or similar in terms of function are identified by the same reference signs in the figures.

DETAILED DESCRIPTION

Figure 1:
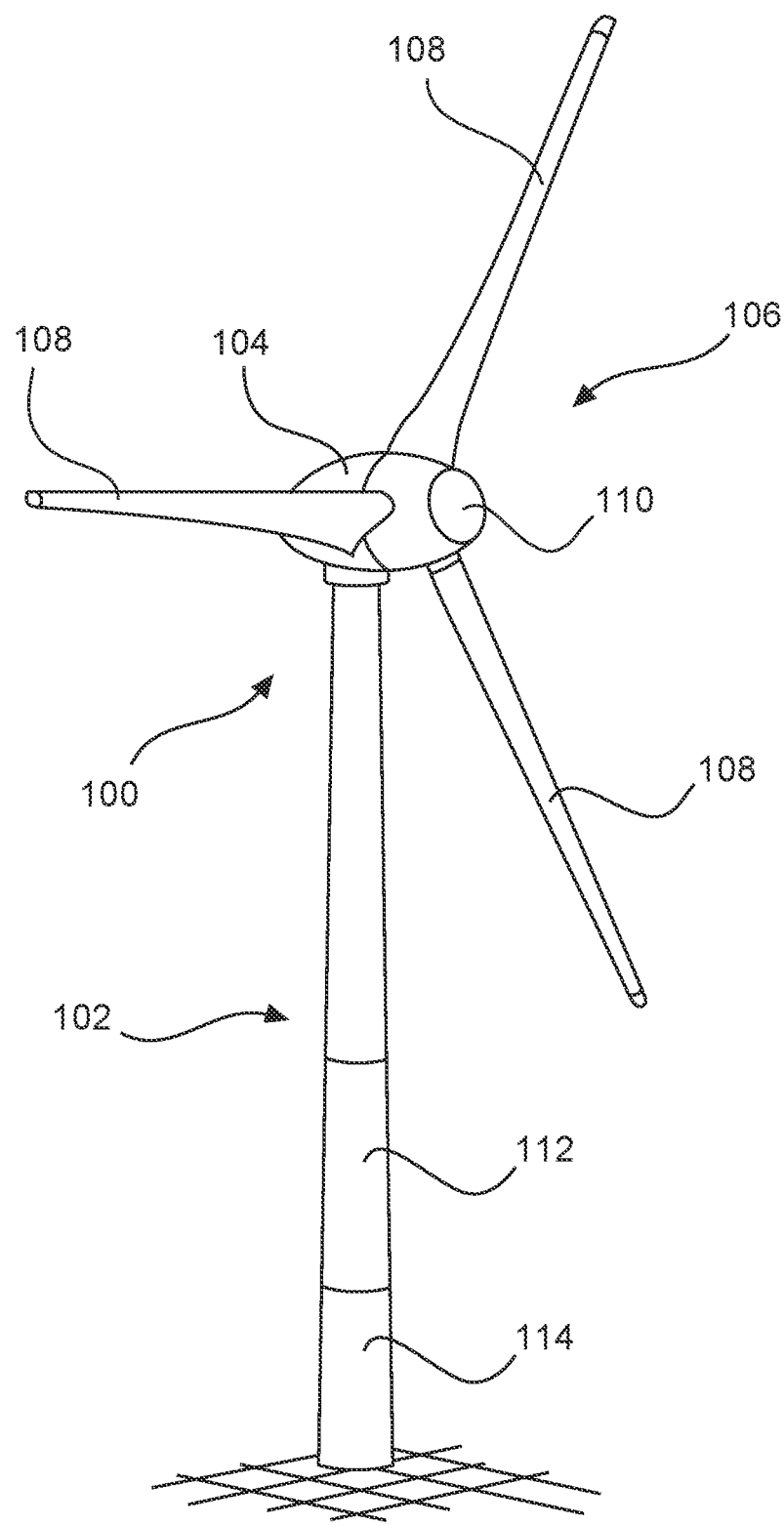
FIG. 1 shows a schematic, three-dimensional, view of an exemplary embodiment of a wind power installation.

FIG. 1 shows a schematic, three-dimensional, view of an exemplary embodiment of a wind power installation 100. The wind power installation 100 has a tower 102 and a nacelle 104 on the tower 102. An aerodynamic rotor 106 having rotor blades 108 and a spinner 110 is provided on the nacelle 104. The aerodynamic rotor 106 in the operation of the wind power installation 100 is set in a rotating motion by the wind and thus also rotates an electorate dynamic rotor or armature of a generator which is coupled directly or indirectly to the aerodynamic rotor 106. The electric generator is disposed in the nacelle 104 and generates electric energy.

The tower 102 comprises at least two tower segments 112, 114 which are mutually spaced apart in the vertical direction. The upper tower segment 112 has at least one lower flange. The lower tower segment 114 has at least one upper flange. The lower flange and the upper flange in the assembled wind power installation 100 bear substantially on one another.

Said flanges furthermore have in each case passage openings, wherein one passage opening of the upper flange is in each case assigned to a passage opening of the lower flange such that said passage openings have a common passage axis. Fastening elements, in particular screws, which connect the two flanges to one another are guided through these openings. The tower segments 112, 114 are connected to one another by connecting the flanges.

On account of the high number of fastening elements per flange connection, the assembly and maintenance complexity and optionally also the post-assembly testing complexity is complex. The wind power installation 100 has been assembled using a displaceable maintenance device 200. The displaceable maintenance device 200 comprises a mobile unit 210 which is specified for moving the maintenance device 200 along the flange of the wind power installation tower 102. The displaceable maintenance device 200 furthermore comprises a first maintenance unit 230 having an impact element 232 for impacting a fastening element 4, and the noise-receiver units 234 for detecting a noise generated by the impacting.

The displaceable maintenance device 200 moreover comprises a control unit (controller) 240 for evaluating the noises detected by means of the noise-receiver unit 234, said control unit 240, based on the evaluation, being specified for assigning a maintenance status to a fastening element 4. The maintenance device 200 during maintenance can move along the flange 1 of the tower 102. A fastening element of this flange is thereafter impacted, the noise generated by the impacting is detected, and this noise is subsequently evaluated, wherein a maintenance status is assigned to the fastening element 4.

Furthermore, a displaceable assembly device 300 has been used when assembling the wind power installation tower 102. The displaceable assembly device 300 comprises a second climbing unit 310 which is specified for moving the assembly device 300 along a cat ladder 331 of a wind power installation tower 102. The assembly device 300 moreover comprises second maintenance unit having an impact element 232 for impacting a fastening element 4, and a noise-receiver unit 234 for detecting a noise generated by the impacting, and a control unit 240 for evaluating the noises detected by means of the noise-receiver unit 234, said control unit 240, on the basis of the noise, being specified for assigning a maintenance status to the fastening element. Additionally or alternatively, the assembly device 300 can comprise an assembly unit 340 having an assembly arm 342 for positioning an assembly to 344 on a fastening element 4 of the wind power installation tower 102, wherein the assembly tool 344 is specified for fastening the fastening element 4.

A method for servicing and/or assembling the fastening elements of the flanges of the wind power installation tower 102 has preferably been used, said method comprising the following steps: moving an assembly device 300 along a cat ladder of the wind power installation tower 102; impacting the fastening element 4, detecting a noise generated by the impacting, evaluating the noise, and assigning a maintenance status to the fastening element 4; and/or positioning an assembly tool on the fastening element 4 and fastening the fastening element 4.

Figure 2:
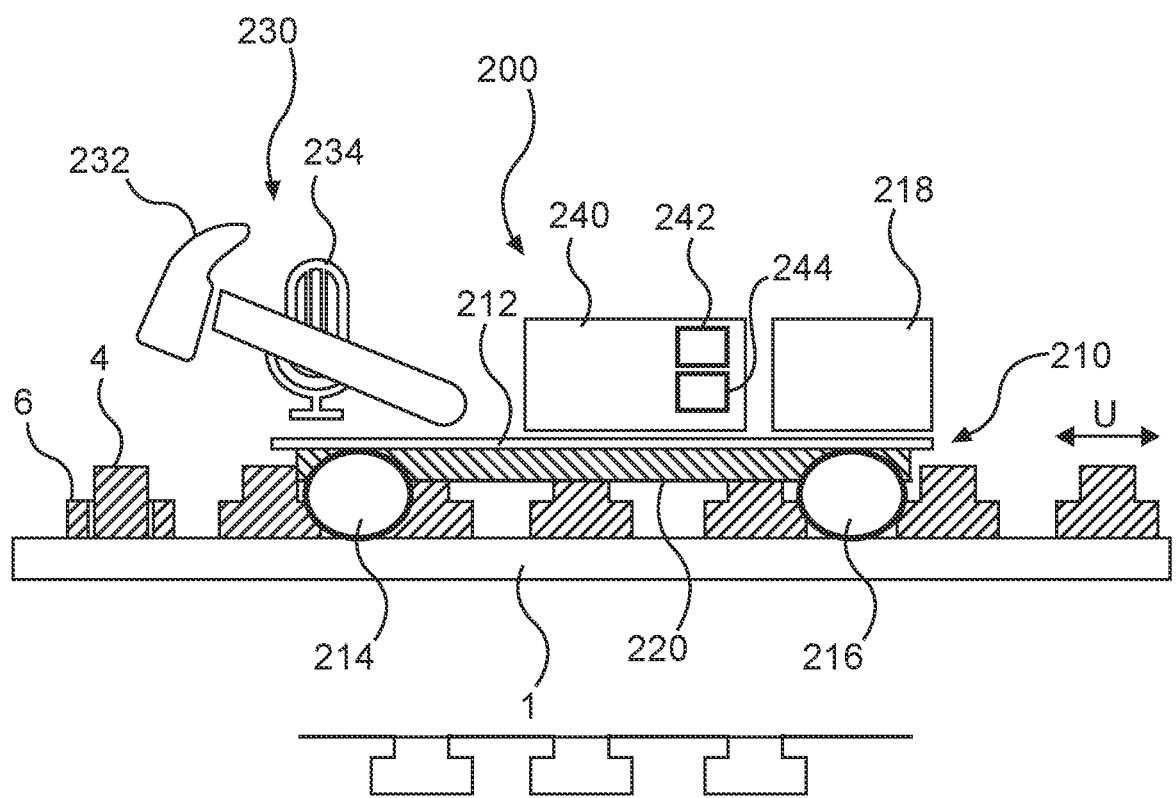
FIG. 2 shows a schematic, two-dimensional, view of a displaceable maintenance device.
Figure 3:
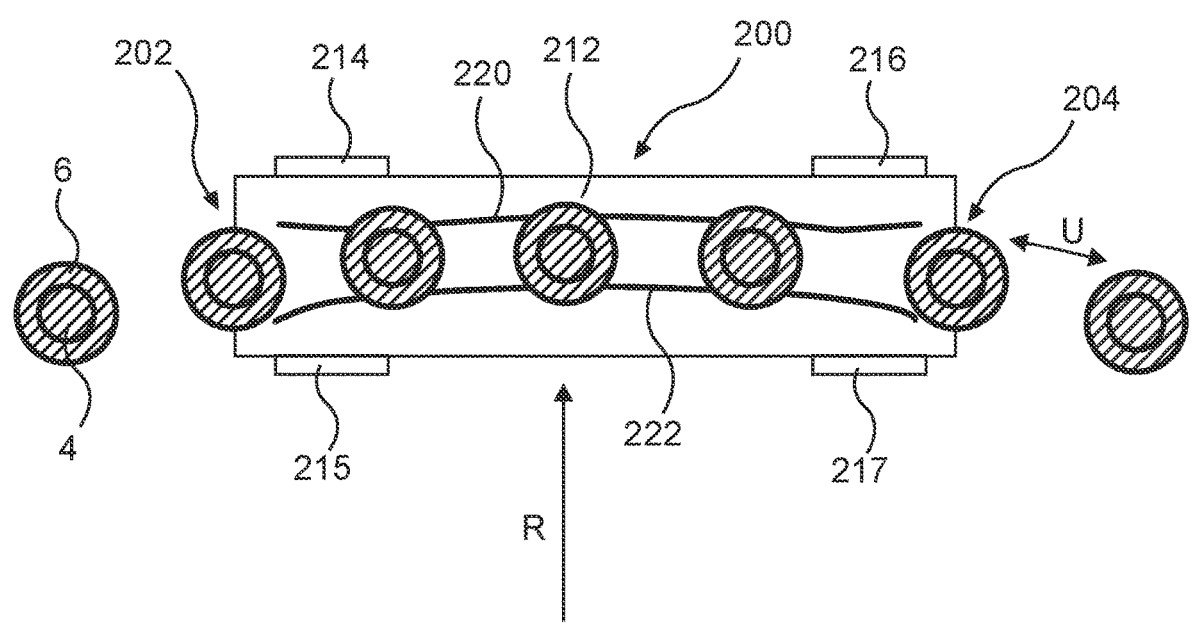
FIG. 3 shows a schematic, two-dimensional, view of the maintenance device shown in FIG. 2.

FIG. 2 shows a schematic, two-dimensional, view of a displaceable maintenance device 200. The maintenance device 200 is disposed on an upper flange 1 of a tower segment 112 of a wind power installation 100. The upper flange 1 has a plurality of fastening elements 4 which are secured by means of nuts 6. The maintenance device 200 is disposed on the upper face of the upper flange 1. The maintenance device 200 comprises a mobile unit 210. The maintenance device 200 furthermore comprises a support element 212. The first and second front wheel elements 214, 215, shown in FIG. 3, and the first and second rear wheel elements 216, 217 are disposed on the support element 212. The mobile unit furthermore comprises a drive unit 218 which is coupled to at least one of the wheel elements 214 to 217. The wheel elements 214 to 217 can be driven by means of the drive unit 218 such that the maintenance device 200 can move in the circumferential direction U.

The support element 212, on the lower side thereof that faces the flange 1, has a first guide rail 220 and a second guide rail 222. The guide rails 220, 222 in the operation of the maintenance device 200 are mutually spaced apart in the radial direction of the tower in such a manner that a fastening element 4 and optionally also a nut 6 can be disposed therebetween. Said guide rails 220, 221 are in particular disposed in such a manner that at least two, preferably three, preferably more than three, fastening elements 4 and/or nuts 6 can be disposed between the first guide rail 220 and the second guide rail 222.

The maintenance device 200 furthermore has the first maintenance unit 230. The first maintenance unit 230 comprises the impact element 232 and the noise-receiver unit 234. The impact element 232 is specified for impacting the fastening element 4. The noise-receiver unit 234 is specified for detecting a noise generated by the impacting. The maintenance device 200 moreover comprises a control unit 240 which is specified for evaluating the noise detected by means of the noise-receiver unit and, based on this evaluation, to assign a maintenance status to the impacted fastening element.

The maintenance device 200 preferably extends from a first end 202 toward a second end 204. The drive unit 218 is disposed at the first end 202. The first maintenance unit 230 is disposed at the second end 204. The control unit 240 is disposed between the first maintenance unit 230 and the drive unit 218. The support element 212 has a substantially rectangular geometry, wherein the extent from the first end 202 to toward the second end 204 represents the direction of main extent. The rotation axis of the wheel elements 214 to 217 is disposed between the first end 202 and the second end 204 so as to be orthogonal to this main extent. The maintenance device 200 furthermore has an interface 242 and a storage medium 244.

Figure 4:
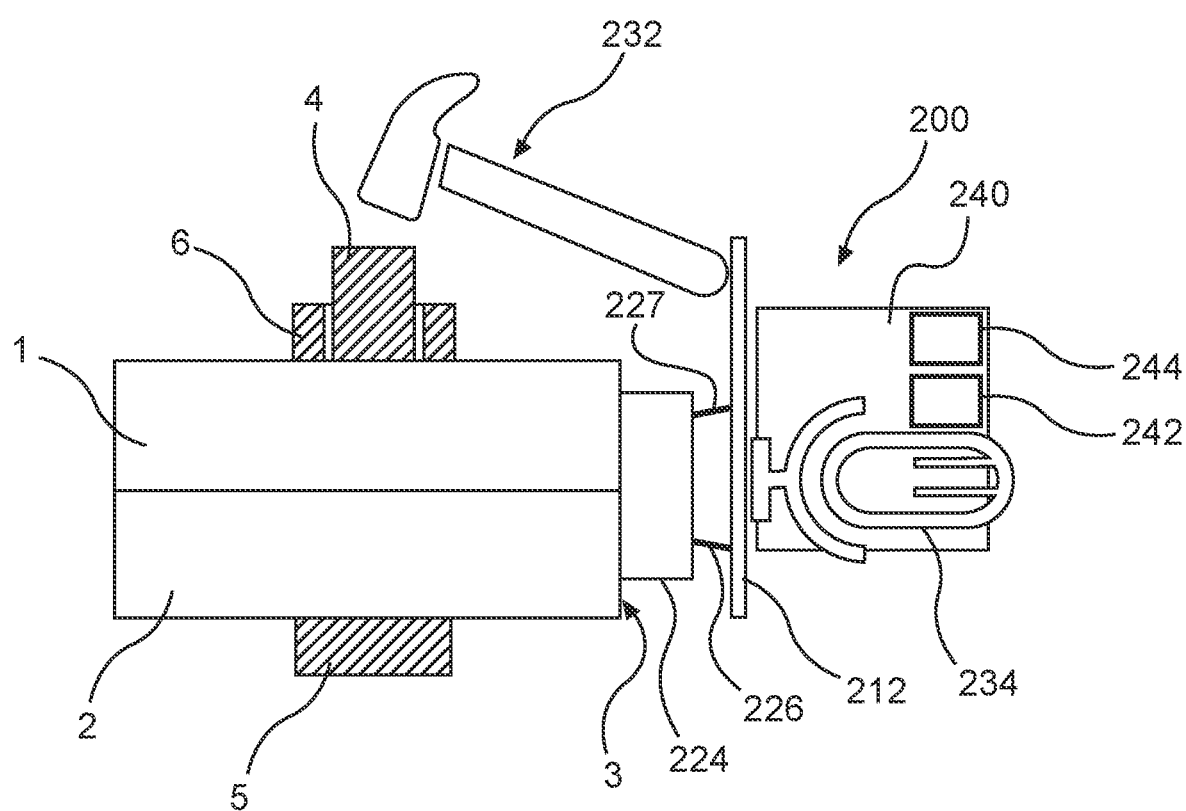
FIG. 4 shows a schematic, two-dimensional, view of a further exemplary embodiment of a displaceable maintenance device.
Figure 5:
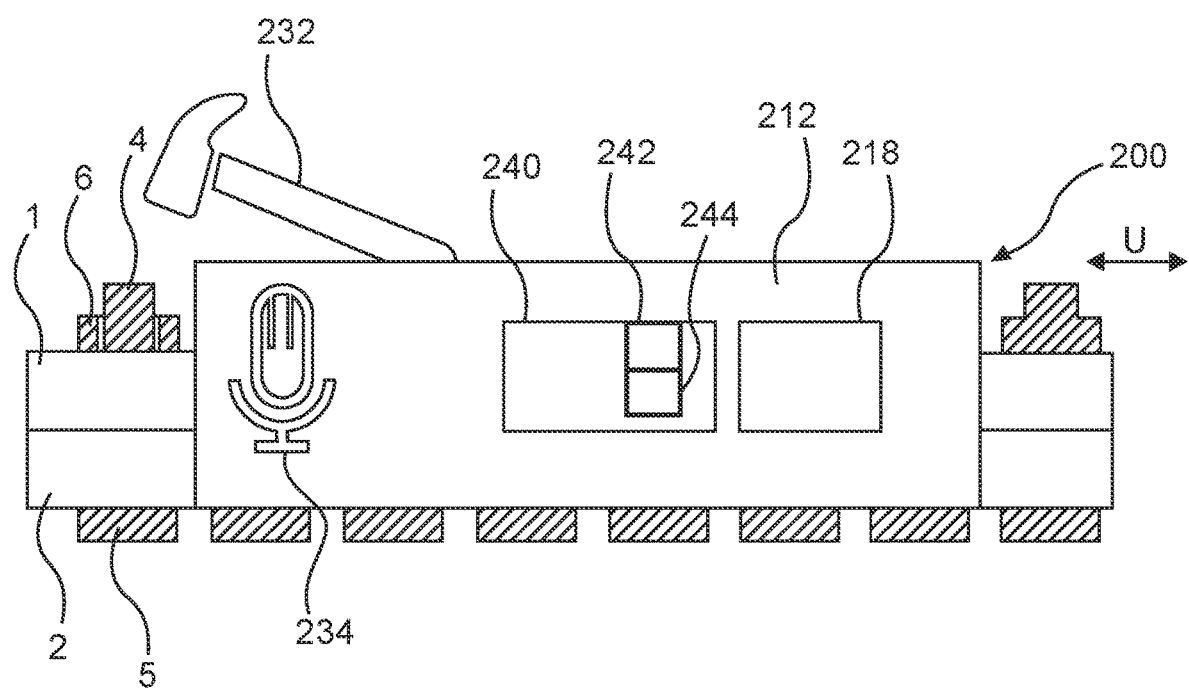
FIG. 5 shows a schematic, two-dimensional, view of the displaceable maintenance device shown in FIG. 4.

FIGS. 4 and 5 show an exemplary embodiment of a displaceable maintenance device. The mobile unit 210 has a magnetic unit 224. The magnetic unit 224 is specified for moving the maintenance device 200 along the flanges on a vertical internal circumferential face of said flanges 1, 2. The magnetic unit 224 is coupled to the support element 212 by means of a first structural element 226 and a second structural element 227. The maintenance device 200 by means of the magnetic unit 224 can move in the circumferential direction U along the vertical internal circumferential face 3.

Figure 6:
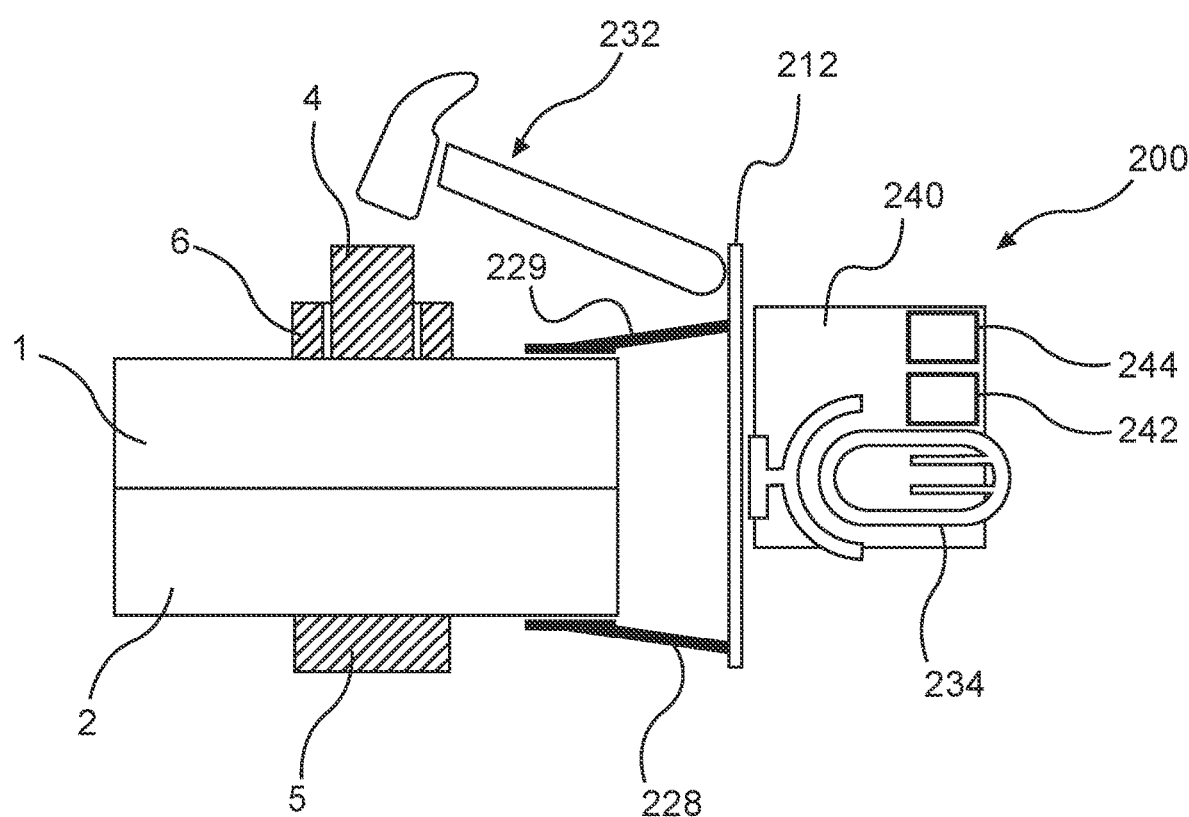
FIG. 6 shows a schematic, two-dimensional, view of a further exemplary embodiment of a displaceable maintenance device.

FIG. 6 shows a schematic, two-dimensional, view of a further exemplary embodiment of a displaceable maintenance device. The maintenance device 200 by way of the support element 212 is coupled to the upper flange 1 by means of an upper clamp 229, and coupled to the lower flange 2 by means of a lower clamp 228. A movement of the maintenance device 200 in the circumferential direction U is possible by means of the upper clamp 228 and/or the lower clamp 229.

Figure 7:
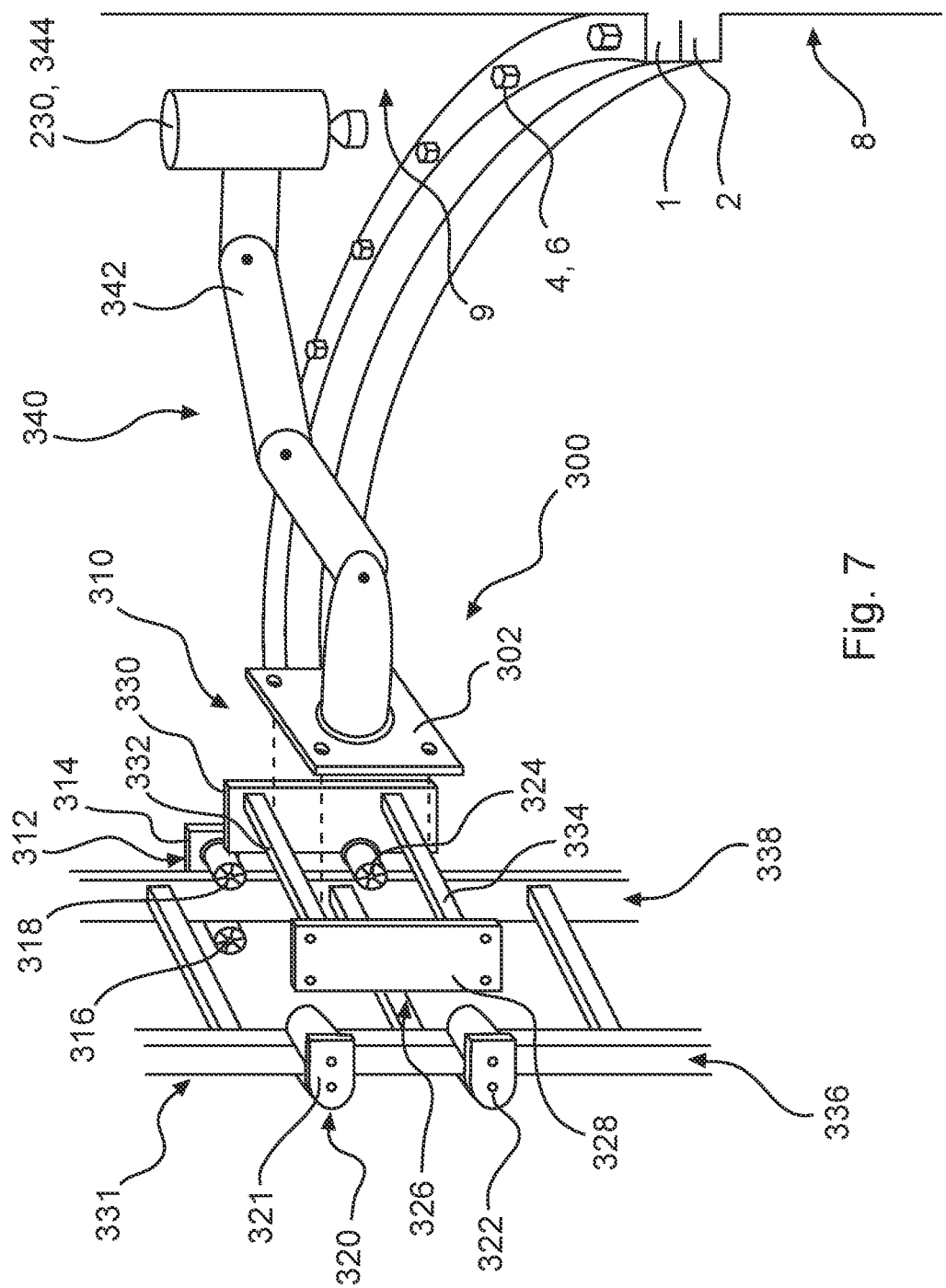
FIG. 7 shows a schematic, three-dimensional, view of an exemplary embodiment of a displaceable assembly device.

FIG. 7 shows a schematic, three-dimensional, view of an exemplary embodiment of a displaceable assembly device 300. The displaceable assembly device 300 has a second climbing unit 310 which is specified for moving the assembly device 300 along a cat ladder 331. The displaceable assembly device 300 furthermore comprises an assembly unit 340. The assembly unit 340 has an assembly arm 342 which is configured as an articulated arm, and an assembly tool 344. The assembly tool 344 is specified for fastening the fastening element 4, 6. Alternatively or additionally to the assembly tool 344, the assembly device 300 can have a second maintenance unit which can be, or is, configured in a manner analogous to that of the first maintenance unit 230. That end of the assembly arm 342 that faces away from the assembly tool 344 has a fastening plate 302 by way of which the assembly arm 342 is coupled to a coupling device 326.

The coupling device 326 has two vertically aligned lateral walls 328, 330. A first bar 332 and a second bar 334 extends between the lateral walls 328, 330. The bars 332, 334 by way of the direction of main extent thereof extend substantially in the horizontal direction. The coupling device 326 is coupled to a first clamping unit 312 and a second clamping unit 320.

The first clamping unit 312 will be explained in more detail hereunder as an exemplar for the clamping units. The first clamping unit 312 has a vertically aligned base plate 314 which is aligned so as to be substantially parallel to the faces of the lateral walls 328, 330 of the coupling device 326. A clamping roller is disposed in the region of each corner of the base plate 314; the first clamping roller 316, the second clamping roller 318, and the third clamping roller 324 can be seen here. The clamping rollers 316, 318 are disposed so as to be spaced apart in a region on an upper edge of the base plate 314. The clamping rollers 316, 318 in the radial direction are spaced apart in such a manner that the second strut 338 of the cat ladder 331 can be disposed between said clamping rollers 316, 318. The bars of the cat ladder extend between the first strut 336 and the second strut 338.

The assembly device 300 can be used for assembling and/or servicing the fastening elements 4, 6. On account of the articulated arm 342 of the assembly unit 340, the assembly tool 344 can be flexibly disposed within the tower, and the fastening elements 4, 6 can be reached by the assembly tool 344.

Figure 8:
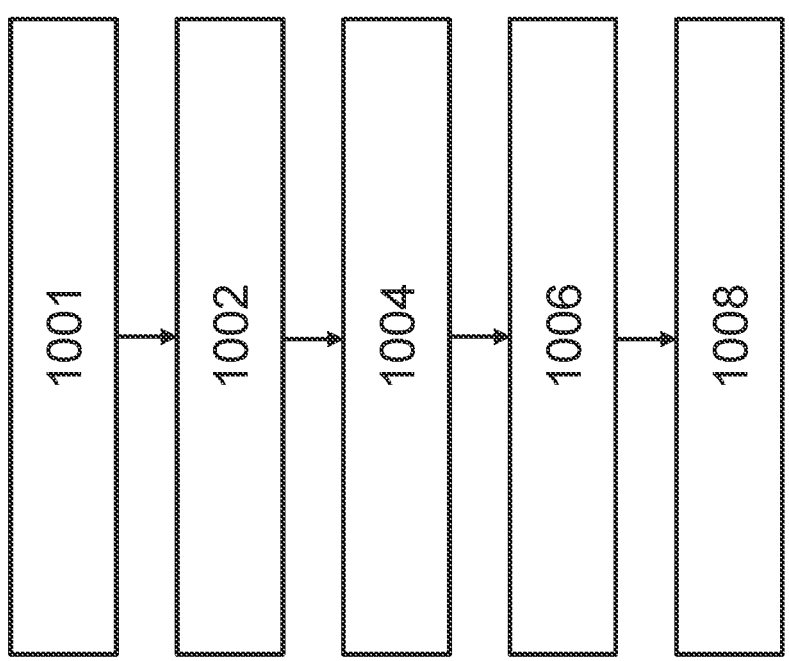
FIGS. 8-9 show schematic exemplary methods for servicing a fastening element of a wind power installation tower.
Figure 9:
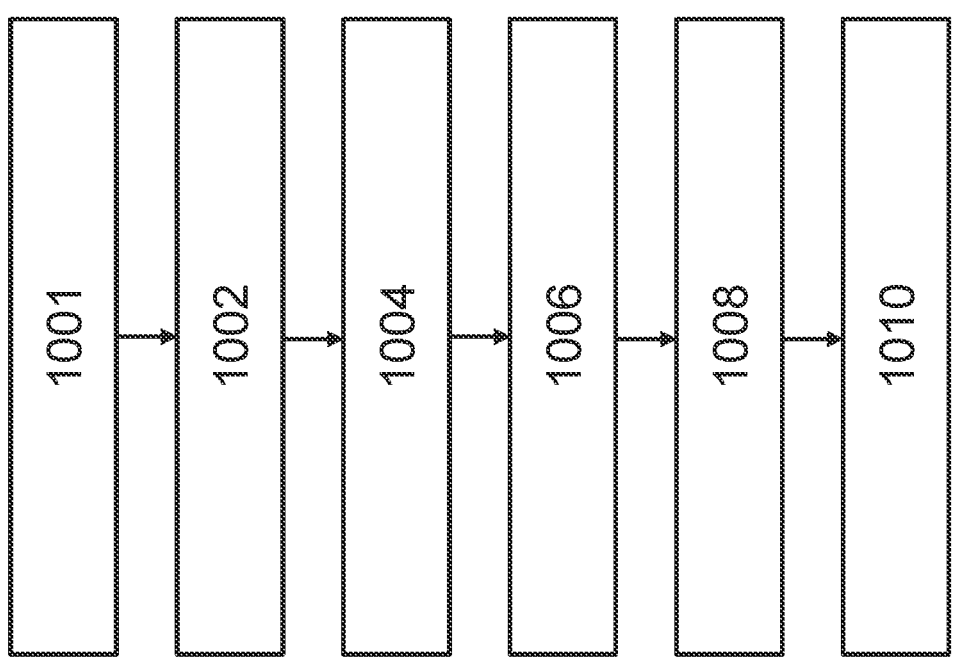

FIG. 8 and FIG. 9 show schematic exemplary methods for servicing a fastening element of a wind power installation tower. In a first step 1001, the maintenance device 200 is moved along a flange 1 of a wind power installation tower 102. In step 1002, a fastening element 4 of the flange 1 is impacted. In step 1004, the noise generated by the impacting is detected. The detected noise is evaluated in step 1006. In step 1008, the assignation of a maintenance status to the fastening element 4 takes place based on the evaluation. A maintenance status can assume the value of tight, loose, or else the defined indication of a tightening torque, for example.

A variant of the afore-described method is shown in FIG. 9; in step 1010 here the maintenance device 200 is moved into a region adjacent to a cat ladder 331 of the wind power installation tower 102. In step 1010, the maintenance device 200 is moreover moved along the cat ladder 331, preferably upward in the vertical direction. The maintenance device 200 can thus make its way from one flange to a higher flange without manual steps being required.

Figure 10:
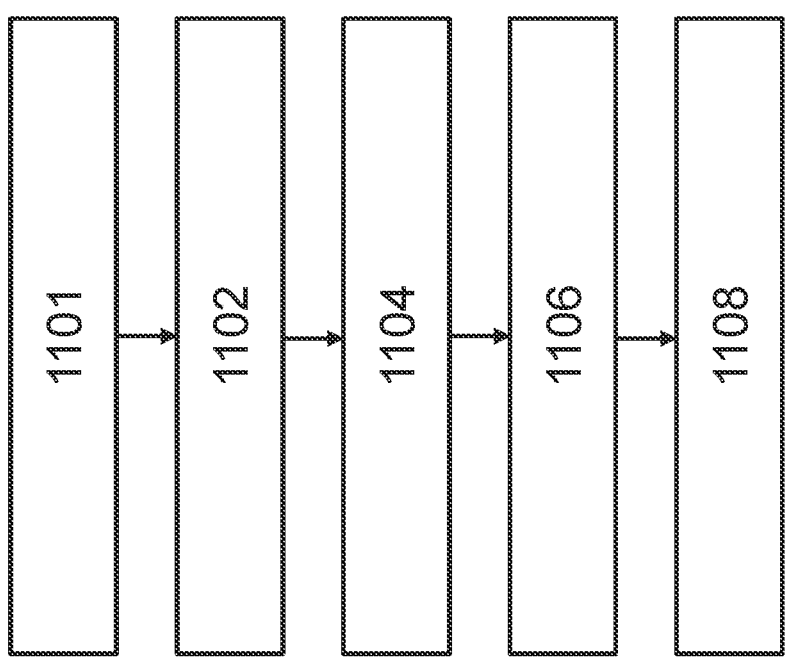

FIG. 10 and FIG. 11 show schematic exemplary methods for servicing and/or assembling a fastening element 4, 6 of a flange 1 of a wind power installation tower 102. In step 1101, the assembly device 300 is moved along the cat ladder 331 of the wind power installation tower 102. In step 1102, the fastening element 4 is impacted. In step 1104, the noise generated by the impacting is detected. In step 1106, this noise is evaluated and a maintenance status is assigned to the impacted fastening element 4, 6. In step 1108, an assembly tool 344 is positioned on the fastening element 4, 6, and the fastening element is fastened. Steps 1106 and 1108 can be carried out alternatively or additionally to one another.

The method shown in FIG. 11 is a preferred variant of the afore-described method, wherein in step 1110 the fastening element 4, 6 is pre-tensioned by means of an assembly tool 344. Furthermore, in this step the assembly device 300 is moved upward in the vertical direction, and the step of positioning described above is subsequently carried out.

LIST OF REFERENCE SIGNS

1 Upper flange
2 Lower flange
3 Vertical internal circumferential face of the flange
4 Fastening element
5 Head
6 Nut
8 Upper tower wall
9 Lower tower wall
100 Wind power installation
102 Tower
104 Nacelle
106 Rotor
108 Rotor blades
110 Spinner
200 Maintenance device
202 First end
204 Second end
210 Mobile unit
212 Support element
214 First front wheel element
215 Second front wheel element
216 First rear wheel element
217 Second rear wheel element
218 Drive unit
220 First guide rail
222 Second guide rail
224 Magnetic unit
226 First structural element
227 Second structural element
228 Lower clamp
229 Upper clamp
230 First maintenance unit
232 Impact element
234 Noise-receiver unit
240 Control unit
242 Interface
244 Storage medium
300 Assembly device
302 Fastening plate
310 Climbing unit
312 First clamping unit
314 Base plate
316 First clamping roller
318 Second clamping roller
320 Second clamping unit
321 Clamping roller
322 Clamping roller
324 Third clamping roller
326 Coupling device
328 First lateral wall
330 Second lateral wall
331 Cat ladder
332 First bar
334 Second bar
336 First strut
338 Second strut
340 Assembly unit
342 Assembly arm
344 Assembly tool The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A displaceable maintenance device for a wind power installation tower comprising:
   a mobile unit configured for moving the maintenance device along a flange of the wind power installation tower;
   a first maintenance unit having an impact element for impacting a fastening element and a noise-receiver for detecting a noise generated by the impacting; and
   a controller for evaluating the noise detected by the noise-receiver, the controller, based on the evaluation, being configured for assigning a maintenance status to the fastening element.

2. The displaceable maintenance device as claimed in claim 1, comprising:
   at least one guide rail for guiding the maintenance device along the fastening element of the flange, wherein an inner guide rail and an outer guide rail are disposed in such a manner that, when displacing the maintenance device along the flange, the inner guide rail is disposed on a radially inward side of the fastening element, and the outer guide rail is disposed on a radially outward side of the fastening element that lies opposite the inward side.

3. The displaceable maintenance device as claimed in claim 1, wherein the mobile unit has a plurality of wheel elements.

4. The displaceable maintenance device as claimed in claim 1, wherein:
   the mobile unit comprises a magnetic unit configured for moving the maintenance device on a vertical internal circumferential face along the flange; and
   the maintenance device has a support element coupled to the magnetic unit by structural elements.

5. The displaceable maintenance device as claimed in claim 1, wherein the mobile unit has an upper clamp and a lower clamp, wherein the upper clamp is configured to act in a supporting manner on a vertically upper side of the flange, and the lower clamp is configured to act in a supporting manner on a vertically lower side of the flange.

6. The displaceable maintenance device as claimed in claim 1, wherein the mobile unit comprises a drive unit.

7. The displaceable maintenance device as claimed in claim 1, wherein the noise-receiver is configured as a microphone or an accelerometer.

8. The displaceable maintenance device as claimed in claim 1, comprising an interface for reading the maintenance status, wherein the interface is configured as a wire-based interface or a wireless interface.

9. The displaceable maintenance device as claimed in claim 1, wherein:
   the controller is configured for moving the maintenance device along the flange by actuating the mobile unit; and
   the actuation takes place in such a manner that the maintenance device is moved along the flange in such a manner that successive impacting of fastening elements by the impact element takes place.

10. The displaceable maintenance device as claimed in claim 1, wherein the controller is configured for storing the maintenance status in a readable storage medium.

11. The displaceable maintenance device as claimed in claim 1, wherein:
   the controller is coupled to the first maintenance unit and configured for providing an impact signal for carrying out the impacting for the first maintenance unit, and the first maintenance unit when receiving the impact signal is configured for carrying out the impacting of the fastening element and for receiving a noise signal which characterizes the noise and is generated by the first maintenance unit, and for evaluating the noise signal in terms of the maintenance status; and
   the maintenance status represents the fastening element that is disposed according to the intended use.

12. The displaceable maintenance device as claimed in claim 1, comprising a first climbing unit configured for moving an assembly device along a cat ladder of the wind power installation tower.

13. A displaceable assembly device for a wind power installation tower, comprising:
   a second climbing unit which is configured for moving the assembly device along a cat ladder of the wind power installation tower;
   a second maintenance unit having an impact element for impacting a fastening element,
   a noise-receiver for detecting a noise generated by the impacting,
   a control unit for evaluating the noise detected by the noise-receiver, the control unit, based on the noise, being specified for assigning a maintenance status to the fastening element; and
   an assembly unit having an assembly arm for positioning an assembly tool on the fastening element of the wind power installation tower, wherein the assembly tool is specified for fastening the fastening element.

14. The displaceable assembly device as claimed in claim 13, wherein:
   the second climbing unit has a clamping device for disposing the assembly device on the cat ladder; and
   the clamping device has a first clamping unit and a second clamping unit.

15. The displaceable assembly device as claimed in claim 14, wherein:
   each of the first clamping unit and the second clamping unit have two clamping rollers for fixing the assembly device in a vertical direction, wherein the respective two clamping rollers are configured to be disposed on two opposite sides of a strut of the cat ladder that are spaced apart in a radial tower direction; and
   each of the first clamping unit and the second clamping unit have four clamping rollers that are disposed in pairs on top of one another in the vertical direction.

16. The displaceable assembly device as claimed in claim 15, wherein the clamping rollers are able to be driven by a drive so as to move the assembly device in the vertical direction along the cat ladder.

17. The displaceable assembly device as claimed in claim 13, wherein the assembly arm is configured as an articulated arm.

18. The displaceable assembly device as claimed in claim 13, wherein the assembly tool is configured as at least one of: a screwdriver tool for generating a torque on the fastening element or a tensioning cylinder for stretching the fastening element.

19. A method for servicing a fastening element of a flange of a wind power installation tower, the method comprising:
   moving the displaceable maintenance device as claimed in claim 1 along the flange of the wind power installation tower; and
   impacting the fastening element, detecting the noise generated by the impacting, evaluating the noise, and assigning the maintenance status to the fastening element.

20. The method as claimed in claim 19, comprising:
moving the displaceable maintenance device into a region adjacent to a cat ladder of the wind power installation tower; and
moving the maintenance device along the cat ladder in a vertical direction.

21. A method for servicing or assembling a fastening element of a flange of a wind power installation tower, the method comprising:
moving the displaceable assembly device as claimed in claim 13 along the cat ladder of the wind power installation tower;
impacting the fastening element, detecting the noise generated by the impacting, evaluating the noise, and assigning the maintenance status to the fastening element; and
positioning the assembly tool on the fastening element and fastening the fastening element.

22. The method as claimed in claim 21, comprising:
disposing and pre-tensioning the fastening element by the assembly tool; and
moving the assembly device upward in a vertical direction, and subsequently carrying out the positioning.

\* \* \* \* \*